United States Patent [19]

Ferguson et al.

[11] Patent Number: 5,504,894
[45] Date of Patent: Apr. 2, 1996

[54] WORKLOAD MANAGER FOR ACHIEVING TRANSACTION CLASS RESPONSE TIME GOALS IN A MULTIPROCESSING SYSTEM

[75] Inventors: Donald F. Ferguson, Bayside; Leonidas Georgiadis, Chappaqua; Christos N. Nikolaou, New York, all of N.Y.

[73] Assignee: International Business Machines Corporation, Armonk, N.Y.

[21] Appl. No.: 876,670

[22] Filed: Apr. 30, 1992

[51] Int. Cl.$^6$ ....................................... G06F 9/46
[52] U.S. Cl. .................. 395/650; 364/281; 364/281.3; 364/281.8; 364/975.5; 364/230.3; 364/281.6; 364/281.7
[58] Field of Search ............. 364/DIG. 1, DIG. 2, 364/401; 395/650

[56] References Cited

U.S. PATENT DOCUMENTS

| | | | |
|---|---|---|---|
| 4,048,452 | 9/1977 | Oehring et al. | 379/113 |
| 4,495,570 | 1/1985 | Kitajima et al. | 395/650 |
| 4,542,458 | 9/1985 | Kitajima et al. | 395/650 |
| 4,748,558 | 5/1988 | Hirosawa et al. | 395/650 |
| 4,757,529 | 7/1988 | Glapa et al. | 379/244 |
| 4,858,120 | 8/1989 | Samuelson | 364/401 |
| 5,031,089 | 7/1991 | Liu et al. | 364/200 |
| 5,115,505 | 5/1992 | Bishop et al. | 395/650 |
| 5,155,851 | 10/1992 | Krishnan | 395/650 |
| 5,212,793 | 5/1993 | Donica et al. | 395/700 |
| 5,283,897 | 2/1994 | Georgiadis et al. | 395/650 |
| 5,381,546 | 1/1995 | Servi et al. | 395/650 |

OTHER PUBLICATIONS

Baker et al, Load Balancing Control for Multiprocessors, IBM Technical Disclosure Bulletin, vol. 20 No. 3 Aug. 1977.

Primary Examiner—Kevin A. Kriess
Assistant Examiner—Lucien Toplu
Attorney, Agent, or Firm—Ronald L. Drumheller

[57] ABSTRACT

In a multiple processor transaction processing system, a class response time goal for each class of transactions is enforced by a workload manager, which computes a current average class response time for each transaction class and derives a current class performance index for each of these classes with respect to its class response time goal. Whenever a transaction arrives, the workload manager considers a number of different possible transaction servers to which that arriving transaction could be routed and predicts estimated new values for the class performance indices for each of the considered routing choices. An overall goal satisfaction index is determined for each one and the routing choice corresponding to the best overall goal satisfaction index is selected as the routing choice. In the preferred embodiment, the workload manager also priority rates or orders the classes in accordance with the current class performance indices so that a transaction of a class which is performing more poorly (as judged by its class performance index) gets a higher dispatch priority at the server to which it is routed than a transaction of a class that is performing better.

8 Claims, 6 Drawing Sheets

WORKLOAD MANAGER FOR ACHIEVING TRANSACTION CLASS RESPONSE TIME GOALS IN A MULTIPROCESSING SYSTEM

FIELD OF THE INVENTION

This invention generally relates to a workload manager for a system of interconnected computers that processes transactions and more particularly to a workload manager of this type for a computer system in which there are different classes of transactions and each transaction class has an individual response time goal.

REFERENCES

1. P. P. Bhattacharya, L. Georgiadis, P. Tsoucas and I. Viniotis, *Optimality and Finite Time Behavior of an Adaptive Multi-objective Scheduling Algorithm*, Proc. of the 29th Conf. on Decision and Control, Honolulu, Hi, December 1990.
2. D. W. Cornell, D. M. Dias, P. S. Yu, *On Multisystem Coupling through Function Request Shipping*, IEEE Transactions on Software Engineering, SE-12(10), October 1986.
3. C. J. Date, *An Introduction to Database Systems*, Volume II, Addison-Wesley Company, Reading Mass., 1983.
4. D. L. Eager, D. Lazowska, J. Zahorjan, *Adaptive Load Sharing in Homogeneous Distributed Systems*, IEEE Transactions on Software Engineering, SE-12(5), May 1986.
5. C. T. Hsieh., S. S. Lam, PAM—*A Noniterative Approximate Solution Method for Closed Multichain Queueing Networks*, Performance Evaluation, 9:119–133, 1989.
6. Y. T. Wang, R. J. Morris, *Load Sharing in Distributed Systems,* IEEE Transactions on Computers, C-34(3), March 1985.
7. A. N. Tantawi, D. Towsley, *Optimal Static Load Balancing in Distributed Computer Systems*, Journal of the ACM, pages 445–465, April 1985.
8. C. Watson, *SLOs, SLAs, SLM: The Three Phases of Service Levels* Mainframe Journal, July 1989.
9. P. S. Yu, S. Balsamo, Y. H. Lee, *Dynamic Transaction Routing in Distributed Database Systems*, IEEE Transactions on Software Engineering, SE-14(9), September 1988.
10. P. S. Yu, D. Cornell, D. M. Dias, A. Thomasian, *On Coupling Partitioned Database Systems*, Proceedings of 6th International Conference on Distributed Computing Systems, 1986.

BACKGROUND OF THE INVENTION

Transaction processing systems are on-line, application-oriented systems typically implemented on a multi-processor data processing system supporting a plurality of terminals, often distributed over a large geographical area. A typical transaction processing system is IBM's ACP (for Airline Control Program) which, although classically used in airlines reservations systems, has been also used in other systems, notably by banks for on-line teller applications.

A large body of prior work has been done on workload management in multiple processor and distributed systems. Both static and dynamic load balance algorithms are described in References 4, 6 and 7. However, these algorithms attempt to minimize average response time over all transaction arrivals and do not consider different classes of transactions which might have different response time goals.

In Reference 1, job classes are assigned response time goals and a scheduling algorithm is proposed that schedules jobs, but this is done all within a single processor. There is no suggestion as to how this algorithm might be extended or modified to apply to a multiprocessor system and to handle the added problem of routing transactions with different response time class goals to multiple computers.

Some research has been done on static and dynamic transaction routing algorithms and has been reported in References 9 and 10. However, this prior work on transaction routing has also focused on minimizing average response time over all arriving transactions and does not address distinct class goals. In general, minimizing overall response time will not satisfy class specific goals.

It would be desirable to have a workload manager for a transaction multiprocessing system that balances workload in accordance with different response time goals for different classes of transactions.

DISCLOSURE OF THE INVENTION

It is an object of this invention to provide a workload manager for a system of interconnected transaction processing computers which balances workload so as to minimize response time dissatisfaction.

It is also an object of this invention to provide such a workload manager for a system in which there are different classes of transactions and each transaction class has an individual response time goal.

Another object is to provide such a workload manager in which the workload is balanced among the processors in said system so as to minimize a response time dissatisfaction performance index for the class of transactions that is being satisfied the poorest relative to its individual response time goal.

A further object is to achieve such workload balancing through routing management of transactions that takes into account different response time goals for different classes of transactions.

Still another object is to predict a response time for each arriving transaction as a function of alternative routing choices.

It is also an object to achieve such workload balancing by providing a scheduling priority for each class of transactions and by dynamically adjusting these scheduling priorities in accordance with the response time dissatisfaction performance index.

Still another object is to achieve such workload balancing though routing management that also takes into account any multiprogramming at the destination processors to which transactions are routed in order to account for any resulting interference with such dynamically adjusted scheduling priorities.

It is also an object to achieve such workload balancing while advantageously taking into account that transactions of a particular class execute more efficiently on a processor that has quicker average access to records needed by a transaction of that class than on another processor that has slower average access to the records needed by a transaction of that class.

These and further objects and advantages have been achieved by this invention in which there are multiple servers that handle transactions and a workload manager for distributing arriving transactions to the servers. A plurality of separate transaction classes are established as well as a class response time goal for each of these classes.

A transaction class is a grouping of transactions based on a variety of characteristics such as transaction program name, transaction code, the user, the terminal or workstation the transaction is submitted from, and possibly many other factors. The class response time goals are preferably specified externally by an operator, but they could be determined in other ways as well.

The workload manager computes a current average class response time for each transaction class and derives a current class performance index for each of these classes with respect to its class response time goal. In the preferred embodiment, the current class performance index for a class is the current average class response time for that class divided by the class response time goal for that class. The current average class response times for the transaction classes and the current class performance index for each class is updated as more recent transactions are completed.

Whenever a transaction arrives, the workload manager considers a number of possible routing choices for the arriving transaction (i.e., different possible servers to which that arriving transaction could be routed) and predicts estimated new values for the class performance indices for each of the possible routing decisions, In the preferred embodiment, all possible routing choices are considered. Total resource consumption, total I/O delays and total communication delays are predicted for each of the considered routing choices. An overall goal satisfaction index is determined for each of the considered routing choices and the routing choice corresponding to the best overall goal satisfaction index is selected as the routing choice. In the preferred embodiment, the overall goal satisfaction index for a possible routing choice is the predicted worst (i.e., highest) class performance index for that routing choice and the best overall goal satisfaction index is the best one (i.e., lowest one) of these worst class performance indices. This is sometimes called a min max function.

In the preferred embodiment, the workload manager also priority rates or orders the classes in accordance with the current class performance indices so that a transaction of a class which is performing more poorly (as judged by its class performance index, which in the preferred embodiment is the ratio of the current average class response time and the class response time goal) gets a higher dispatch priority at the server to which it is routed than a transaction of a class that is performing better.

Each server is functionally independent of the others and can be implemented on a separate computer. If desired more than one server could be implemented on the same physical computer. The router function is also functionally separate from the servers and may be implemented on a separate computer or on a computer which also implements one or more of the servers.

BRIEF DESCRIPTION OF THE DRAWINGS

The foregoing and other objects, aspects and advantages will be better understood from the following detailed description of a preferred embodiment of the invention with reference to the drawings in which.

BEST MODE FOR CARRYING OUT THE INVENTION

This invention implements a new technique for performing dynamic workload management in high performance, multiple processor transaction processing systems. Each transaction generally processes user input data, performs reads and updates against one or more databases, executes application code and returns results to the user. There may be multiple interactions between a user and an executing transaction.

Figure 1:
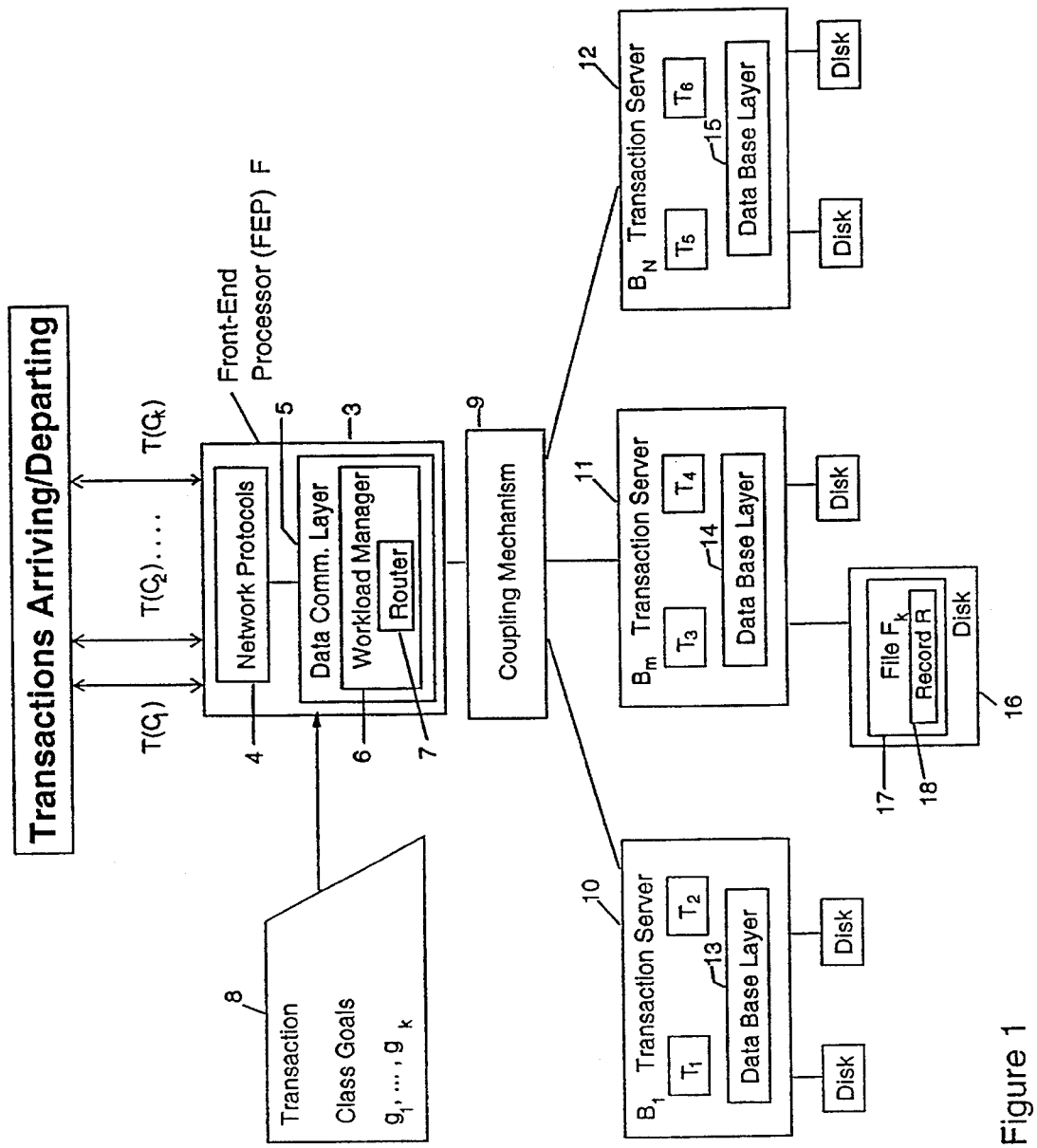
FIG. 1 is a block diagram of a system on which a preferred embodiment of the invention is implemented.

A preferred embodiment of the system hardware architecture is presented in FIG. 1. The work performed by the system are user submitted transactions executing database requests. Reference 3 explains a typical transaction and database request execution. Each submitted transaction belongs to a pre-defined transaction class. FIG. 1 shows 6 different transactions $T_1, T_2, T_3, T_4, T_5, T_6$ being executed by Transaction Server $B_1$, Transaction Server $B_m$ and Transaction Server $B_N$. There are K transaction classes denoted $C_1, C_2, \ldots, C_K$. An arriving/departing transaction in class $C_1$ is denoted, for example, as $T(C_1)$. The identification of an arriving transaction with its class will depend on transaction program name, transaction code, the user and many other factors. Each transaction processes user input data, performs reads and updates against the databases, executes application code and returns results to the user. There may be multiple interactions between the user and the executing transaction.

The transaction processing system consists of a front-end processor (FEP) F, and N transaction servers $B_1, B_2, B_m, \ldots, B_N$. Each server is a fully functional computer system and includes CPUs, memory, disks, etc. These computers are interconnected through a coupling mechanism 9, such as for example a high bandwidth interconnection network. One processor, denoted F, is designated a Front-End Processor (FEP) and contains a Workload Manager 6, which comprises a Router 7. The FEP executes the Network Communication Protocols 4 necessary for communication with the users. The FEP also executes the Data Communication Layer 5 functions of the database system. Reference 3 explains how the Data Communication Layer interfaces with the software that controls the communication hardware of a processor to send and receive messages destined for or originating from terminals or intelligent workstations employed by the database users. Messages originated by the users cause transactions of a specific type to be started by the Data Communication Layer. Responses to the users, originating from executing transactions, are put into messages sent back to the users. One of the components of the Data Communication Layer 5 is the Workload Manager 6. One of the functions of the Workload Manager 6 is to route transactions, such as $T_1, \ldots, T_6$ to the appropriate transaction server. This is performed through a Router 7 component of the Workload Manager. All arriving and completing transactions pass through the FEP. The techniques described herein generalize to the case of multiple FEPs.

The remaining processors function as Back-End Processors (BEP), also called Transaction Servers. It is important to point out that system configurations are possible where the Workload Manager and a Transaction Server reside in the same processor (computer). These processors execute the transaction programs and process the DB requests made by the programs. These functions include concurrency control, indexing, buffering, disk I/O, etc. and comprise the data base layer 13–15. In the model assumed by this embodiment of the invention, the database records are partitioned across the BEPs. Suppose a transaction $T_1$ executing at processor $B_2$ submits an operation on Record R (18) of File (relation, DB) $F_k$(17). If the record is owned by $B_2$, the operation is performed locally. Otherwise, the operation is Function Shipped to the processor $B_m$ owning the record. Reference 2 explains how this is accomplished in CICS, an IBM transaction processing product. $B_m$ processes the operation and returns the result and data to $B_2$, which passes it back to $T_1$. Although we are assuming a partitioned database across the BEPs in this embodiment, the routing algorithm (and a scheduling algorithm that is part of this embodiment) can also be applied to a shared database environment, where a database is shared between the BEPs.

In accordance with the preferred embodiment, the database administrator defines average response time goals for each transaction class. These goals are denoted $g_1, g_2, \ldots, g_k$. The problem is to manage the transaction workload to achieve these goals. The ability to define and achieve performance goals for transaction classes is important for systems processing many different types of transactions submitted by diverse user communities. Furthermore, service level agreements are often specified in terms of required response times for different classes of work. Reference 8 gives examples of various service level agreements used in the industry.

In this embodiment of the invention, two types of workload management techniques are used. The first is use of a transaction routing algorithm that executes in the FEP. Each arriving transaction is routed to one of the BEPs based on the estimated resources required by the transaction, the current system state (load) of the BEPs and how well the response time goals will be satisfied as a consequence of the routing choice. The second is use of a dynamic priority scheme. This scheme dynamically adjusts scheduling priorities in the BEPs. These priorities determine which transaction queued for CPU service is dispatched and it can be preemptive or nonpreemptive.

Routing Technique:

The transaction routing technique executes in the Data Communication Layer of the FEP. It maintains three sets of control variables needed to make routing decisions. These are:

1. $\vec{N} = \{N_1, N_2, \ldots, N_K\}$: The field $N_j$ is the number of class $C_j$ transactions currently in the system (routed to BEPs).

2. $\vec{P} = \{P_1, P_2, \ldots, P_K\}$: The field $P_j$ is called the Performance Index of class $C_j$ and represents the current goal satisfaction of class $C_j$. It is essentially the current average class $C_j$ response time divided by the goal $g_j$. If $P_j \leq 1$ then class $C_j$ is meeting its goal. Smaller Performance Indices imply better performance and goal satisfaction. The technique for maintaining $\vec{P}$ is given below.

3. S: This is the system state information. It includes the history of past routing decisions, the current load of the BEPs, resource usage statistics of the transaction classes, etc. This state information will vary from different implementations of the routing technique. In the third section below, an embodiment of the state information needed for the performance prediction sub-component is presented.

The routing technique uses a sub-function R(S, i,l,j). S is the current system state. i is the class ID of a newly arriving transaction. l is a BEP ID and j is an arbitrary class ID. This sub-function predicts the average response time of the class $C_j$ transactions already in the system if an arriving transaction $T \in C_i$ is routed to BEP $B_l$. An embodiment of R is given below.

The routing technique is invoked for each transaction arrival to the FEP and for each transaction completion.

Arrival Algorithm:

Assume that there is an arriving transaction $T \in C_i$. The following steps are executed:

1. Record the arrival time of T in a field T.arrival_time.

2. For every class $C_j$ and every BEP $B_l$ compute:

$$P(j,l) = \alpha \cdot P_j + (1 - \alpha) \cdot N_j \cdot \left( \frac{R(S,i,l,j)}{g_j} \right).$$

Figure 5:
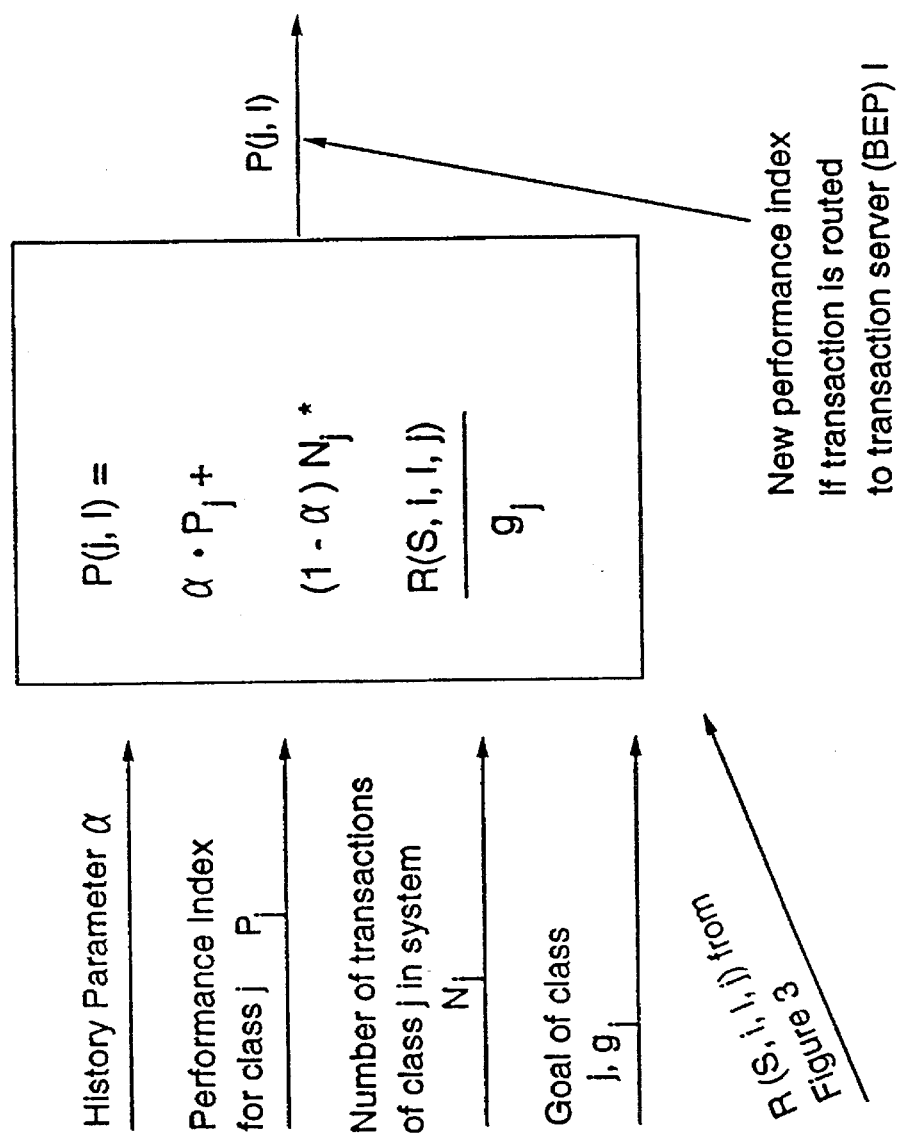
FIG. 5 illustrates the preferred embodiment prediction of new class performance indices for an arriving transaction.

This computation is illustrated in FIG. 5. The value P(j, l) is the estimated new value of the class $C_j$ Performance Index if T is routed to BEP $B_l$. If T is routed to $B_l$ it will affect the response time of class $C_j$ transactions currently active (routed) to $B_l$. T may also cause Function Shipping to other BEPs, and will effect the response time of class $C_j$ transactions routed to other BEPs. The parameter $\alpha$ is in the range $0 \leq \alpha \leq 1$ and is used to weight the importance of current system state versus previously observed :response times (past history).

3. The transaction T is routed to the BEP $B_m$ that satisfies:

$$\min_l \max_j \{P(j,l)\}.$$

This policy attempts to make all Performance Indices equal, and as small as possible. It will attempt to prevent one class from achieving response times far below its goal if this degrades another class exceeding its goal.

4. After T is sent to $B_m$, update $N_j$ and S to reflect the routing.

Figure 6:
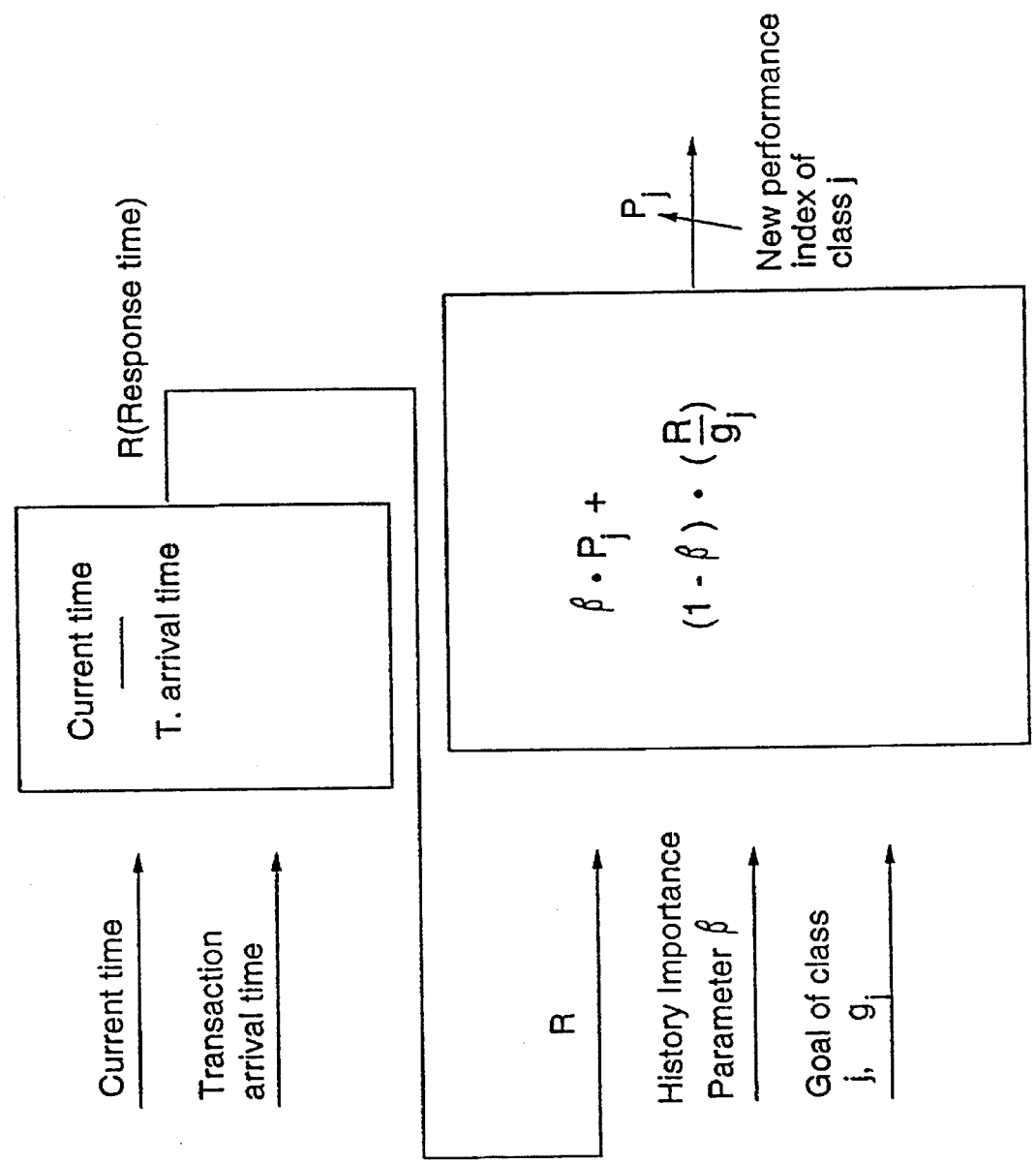
FIG. 6 illustrates the preferred embodiment update of current average class response times when a transaction completes.

Departure Algorithm:

Assume that there is a completion (departure) of a transaction $T \in C_i$. FIG. 6 is a schematic demonstration of the departure algorithm. The following steps are executed:

1. Set R=Current_time–T.arrival_time.

2. Update the value of $P_i$ by $$P_i = \beta \cdot P_i + (1 - \beta) \cdot \left( \frac{R}{g_i} \right).$$

The parameter $\beta$ rates the relative weighting of historical response times versus the response times of recent departures. Other techniques are possible for computing $P_i$ such as taking the average response time of the last a departures in the class.

3. Update $N_i$ and S.

Dynamic Priority Technique:

The FEP/DC Layer is the only component of the transaction processing system that can accurately monitor goal satisfaction. For this reason, the FEP/DC layer sets the transaction class priorities used in the BEPs. The BEPs cannot set priorities based on local information because each BEP sees only a fraction, if any, of the completions within a transaction class. So, BEP information about goal satisfaction will be extremely inaccurate.

The Dynamic Priority Technique is composed of three sub-functions. The first is the FEP/DC function that updates class priorities based on goal satisfaction and communicates updates to the BEPs. The second is a sub-function in the BEPs that receives and processes priority updates sent by the FEP/DC. The final sub-function performs the scheduling policy within a BEP. This last sub-function determines which transaction gets control of the CPU. These three functions are described below.

FEP/DC Update Algorithm:

The FEP/DC update algorithm is invoked each time a transaction completes. It follows step 2 of the departure algorithm described above. This algorithm maintains an internal control variable $o(i)$, $i=1,2,\ldots,K$. The set $o(i)$ is a permutation of the set $\{1, 2, \ldots, K\}$ and represents the transaction class IDs sorted from largest Performance Index to smallest Performance Index. In other words, the set $o(i)$ has the property that $$P_{o(i)} \leq P_{o(i+1)}.$$

Assume that there is a completing transaction $T \in C_i$. The priority update algorithm executes the following steps after the Performance Index $P_i$ is updated:

1. If $P_{o(i)} \leq P_{o(i+1)}$ or $P_{o(i)} \geq P_{o(i-1)}$ THEN
    a. Re-compute the ordering $o(1), o(2), \ldots, o(K)$ based on the current values of the Performance Index.
    b. Send the new value of $\vec{P} = \{P_1, P_2, \ldots, P_K\}$ to every BEP.

The ordered list $o(i)$ is used to lower overhead. There are other possible implementations that would lower the overhead of searching for classes with high values in their Performance Index, such as B-trees, etc. Only changes in the Performance Indices that actually alter the relative ordering of the classes are sent to the BEPs. Changes that do not change the ordering do not effect the priorities in the BEPs, and are not transmitted. To further lower overhead, it is possible to piggyback the updated Performance Indices on transactions routed by the FEP/DC. In this version, each time the FEP/DC routes a transaction to a BEP, it tests if the BEP has been sent the most recently updated value of $\vec{P}$. If not, the new value is attached to the routed transaction and is extracted by the BEP when it receives the transaction. This optimization eliminates the need to send extra message to update priorities. The overhead can be further decreased by requiring a fixed number of completions between sending updated performance index vectors.

An alternative to sending the Performance Index vectors to the BEPs is to only update the priority of the class of a newly routed transaction. For example, suppose that transaction $T_1$ arrives, of class $C_1$. Suppose the FEP decides to mute $T_1$ to BEP $B_3$ and to change the priority of class $C_1$ in BEP $B_3$ from $P_1$ to $P'_1$. Then the message $<P'_1, T_1>$ is sent to BEP $B_3$.

Receive Update Algorithm

Each BEP maintains a local copy of $\vec{P}$. Upon receiving a message (or transaction) containing a new value of $\vec{P}$, the local copy is simply updated.

BEP Scheduling Algorithm

The BEP scheduling algorithm is invoked each time a running transaction T releases the CPU and goes into a wait state. The transaction can go into a wait state for many reasons including waiting for I/O, a function shipping response, user input, locks, etc. If the BEP scheduler is preemptive, then a transaction can be put in wait state if another transaction, belonging to a class with higher priority, has become available for execution. After the event causing the wait completes, T is made ready to run and queues for the CPU. The transaction class of all transactions is known by the BEP. The class of a function shipped request is the same as the class of the transaction for which the request is being performed.

The BEP scheduling algorithm simply dispatches a transaction from the class $C_i$ that has at least one queued transaction, and which has higher priority than all other classes with queued transactions. This is implemented by examining the transaction classes using a round-robin scan. The round-robin scan is used to avoid favoring a class $C_i$ over any other class with the same priority. The priorities of the classes are determined by tile performance indices. In general, the the performance index of a class, the higher its priority is. However, to avoid giving strict priorities to classes whose performance indices are very close, a clustering of classes with similar performance indices to the same priority can be made.

Figure 4:
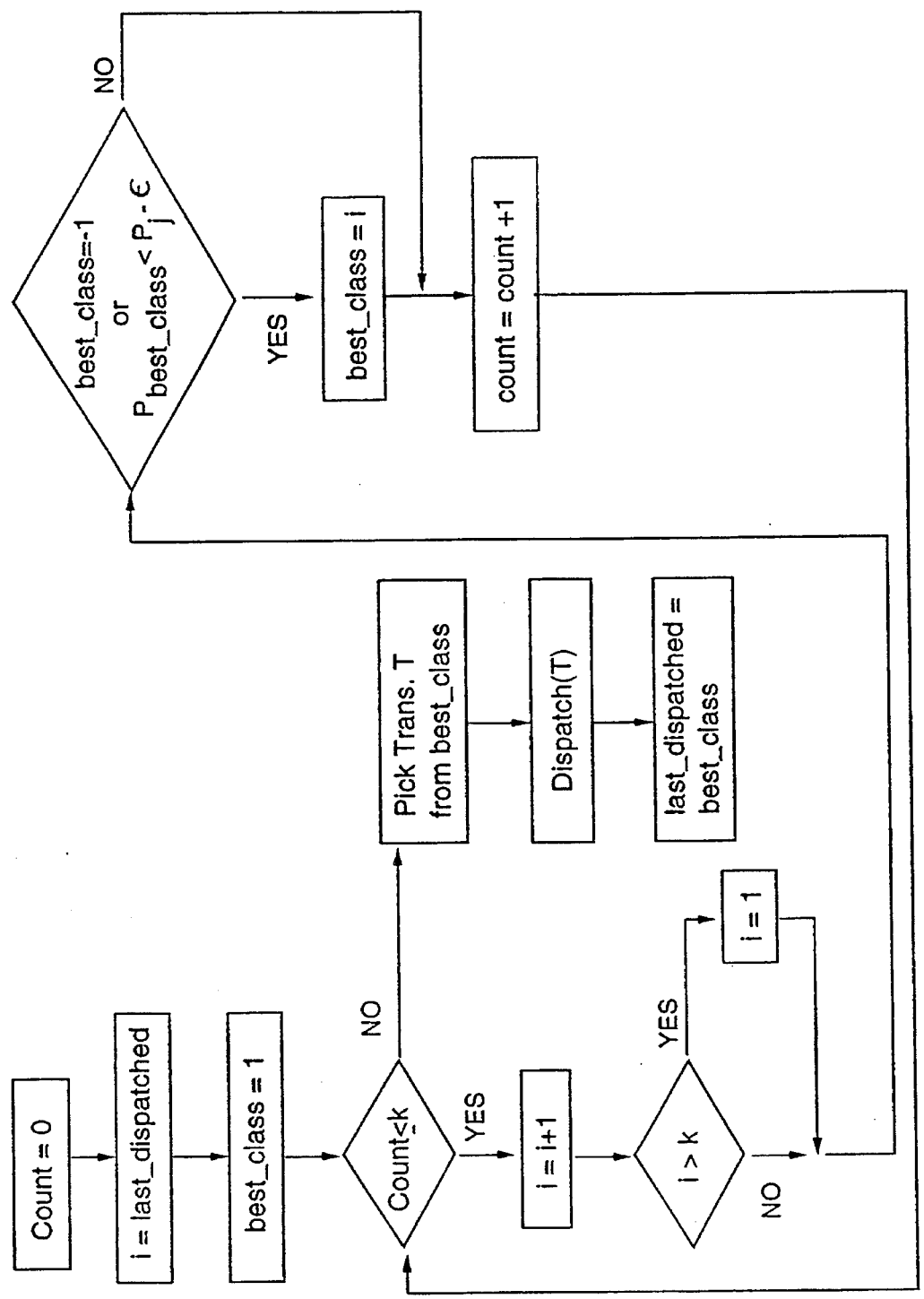
FIG. 4 is a flow diagram of the scheduling algorithm employed by a transaction server in the preferred embodiment.

Each time a running transaction enters a wait state, the following steps are executed, which are also illustrated in FIG. 4:

a. count:=0
b. i:=last_dispatched {last_dispatched records the class ID of the last transaction dispatched by the scheduling algorithm. It is initially set to 1.}
c. best_class:=−1
   {The algorithm examines all of the transaction classes looking for the class with highest priority having queued transactions.}
d. While count≤K DO
   1) i:=i+1
      {The classes are scanned round-robin. If the index has wrapped, then it is set to 1.}
   2) IF i>K THEN
      a) i:=1
      {If the algorithm has not found a transaction ready to run, or the class being examined has higher priority, then we set the current class to be the highest priority class seen so far.}
   3) IF there are transaction of class $C_i$ queued for CPU service:
      a) IF best_class=−1 OR $P_{best\_class} < P_i - \epsilon$ THEN
         {$\epsilon$ is a clustering parameter: If $\epsilon=0$, then the priorities are strictly determined by the perfromance indices. Otherwise, the priorities change only if the difference between the performance indices is $\epsilon$.}
         i. best_class=i;
   4) count:=count+1
      {One more class examined}
   EndWhile;
   {At this point, the class containing the next transaction to dispatch has been found. The policy simply picks a transaction from the class and dispatches it.}
e. IF best_class≠−1 THEN
   1) Pick a queued transaction T from class $C_{best\_class}$
   2) Dispatch(T)
   3) last_dispatched=best_class This algorithm implements a non-preemptive scheduling policy. One possible enhancement to the BEP scheduling algorithm is to implement preemption. Assume a transaction $T \in C_i$ becomes ready to execute. All running transactions are examined to find the transaction $T' \in C_j$ with lowest priority. If $P_i - \epsilon > P_j$, then T' is returned to the queue and T is dispatched.

In some implementations of the transaction processing system, the BEPs may enforce internal multiprogramming level constraints. In this implementation, at most $M_{ik}$ transactions may be active in BEP $B_k$ at any moment. A transaction is active if it has been bound to a process and is allowed to queue for CPU, make DB requests, etc. In-active transactions simply queue waiting for an active transaction to complete before being bound to a process and becoming active. Multiprogramming constraints are usually imposed due to memory limitations and to avoid lock contention. The scheduling algorithm above can also be used to determine which queued, inactive transaction is activated when an active transaction completes. When a transaction or function ship request of class i arrives at $B_k$ it is queued only if there are already $M_{ik}$ active transactions.

Figure 2:
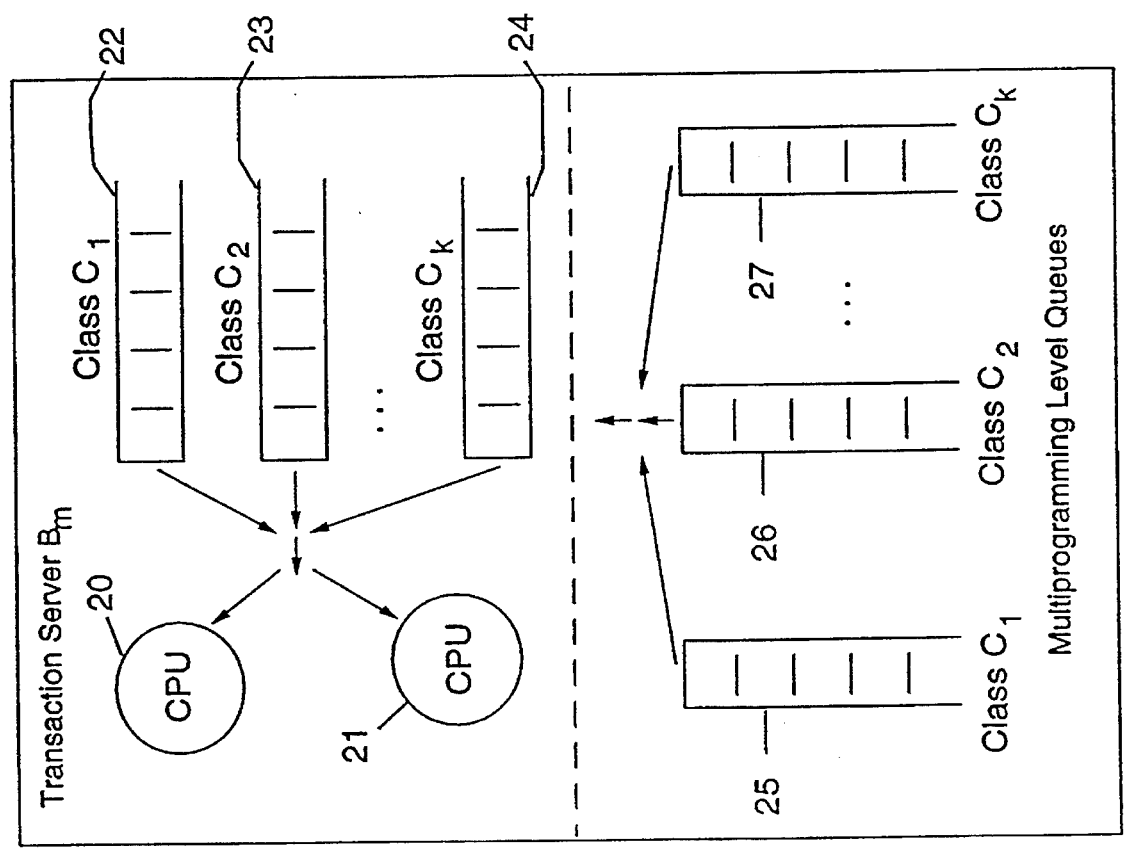
FIG. 2 is a block diagram showing the various queues of transactions waiting to enter the multiprogramming level or waiting for CPU service at a transaction server.

FIG. 2 shows the queue structure within a given transaction server BEP $B_m$. The transaction server may comprise several CPUs (two CPUs 20, 21 are shown). Each transaction class has two queues. The first queue contains active transactions queued for CPU service. The second queue contains in-active transactions waiting for a completion. For example, class $C_1$ has queue 22 containing all active transactions of class $C_1$ waiting for CPU service and queue 25 containing inactive transactions from class $C_1$ waiting for a completion.

Response Time Predictor:

The response time predictor is a sub-component called by the routing technique each time an arrival occurs. This component predicts the effects of a proposed routing decision on the response times of all transactions currently in the system. In this section, one embodiment of this component is presented that assumes a partitioned data base between the BEPs. It is possible to have a response time predictor for the shared data base case, too. Many other embodiments are possible, and related approaches can be found in References 5 and 9. There are two main innovations of this embodiment relative to previous work. First, the previous work does not deal with dynamically changing transaction class priorities in the BEPs. Second, this implementation offers lower overhead than some of the prior work.

The following are the inputs to the predictor:

a. S: The current system state. Below is described the state information used by this embodiment.

b. i: A transaction class ID.

c. l: A BEP ID.

d. j: A transaction class ID.

The predictor returns the average response time of the class $C_j$ transactions currently in the system if an arriving transaction from class $C_i$ is routed to BEP $B_l$.

State Information:

The state information S used by this embodiment of the predictor includes information about transactions already in the system, and estimates of transaction resource consumption broken down by class and BEP. The first component of S represents the number of transactions already in the system. This is denoted M(i, l) and records the number of class $C_i$ transactions routed to BEP $B_l$ that are still in the system. This matrix is updated by the FEP/DC each time an arriving transaction is routed to a BEP, or a transaction in the system completes.

The remaining state information is statistical information about the resource consumptions of the transaction classes. This information can be gathered by monitoring routines in the BEPs. Each BEP can periodically forward recently observed statistics to the FEP/DC which merges the statistics reported by the multiple BEPs. It is usually the case that the DB processors in a transaction processing system gather statistics about transaction resource consumption. This information is used for off-line performance tuning, capacity planning and cost accounting.

The FEP/DC maintains the following resource consumption statistics as part of S:

a. W(i, l, k): This is tile average CPU work generated on BEP $B_k$ by a class $C_i$ transaction routed to BEP $B_l$. CPU time executed on $B_l$ includes application CPU time as well as time for processing DB requests. CPU work may also occur on other BEPs $B_k, k \neq l$ due to function shipping and processing remote DB requests. The elements of this matrix include all of the CPU work that can be attributed to a class $C_i$ transaction.

b. V(i, l, k): This element records the average number of times a class $C_i$ transaction routed to BEP $B_l$ "visits" BEP $B_k$. If $k \neq l$, the visits are the function shipped DB requests (including prepare/commit processing) to $B_k$. For l=k, the visits are defined as the number of DB requests generated by the transaction. This total includes local and remote DB reads, writes as well as local and remote commits.

c. I(i): This is the expected total I/O delay of a class $C_i$ transaction. This includes only the delays in the I/O subsystem. Because of data partitioning, I(i) does not depend on the routing decision for a transaction.

d. D(i, l): This is the expected total communication delay of a class $C_i$ transaction routed to BEP $B_l$. This delay includes function shipping DB requests and commit/prepare messages through the network connecting the BEPs.

e. C(i, l) : This is the expected total I/O delay due to writing log (commit/prepare) records at all sites for a class $C_i$ transaction routed to $B_l$. This delay may depend on the routing decision due to various optimizations in the standard two phase commit protocol.

Estimation Algorithm: The estimation algorithm uses the state information to make its predictions. The algorithm pre-computes the following internal matrices each time the resource consumption statistics in S are updated:

a. T(i,l): This is the sum of the resources consumed by a class $C_i$ transaction routed to $B_l$. It is given by the formula:

$$T(i,l) = \left( \sum_{m=1}^{N} W(i,l,m) \right) + D(i,l) + I(i) + C(i,l).$$

This approximates the response time of a class $C_i$ transaction routed to $B_l$ if no queueing delays are experienced (i.e.- the system is empty).

b. B(i,l,k): This is the mean CPU "burst length" on $B_k$ of a class transaction routed to $B_l$. It is approximated by the formula:

$$B(i,l,k) = \frac{W(i,l,k)}{V(i,l,k)}.$$

Figure 3:
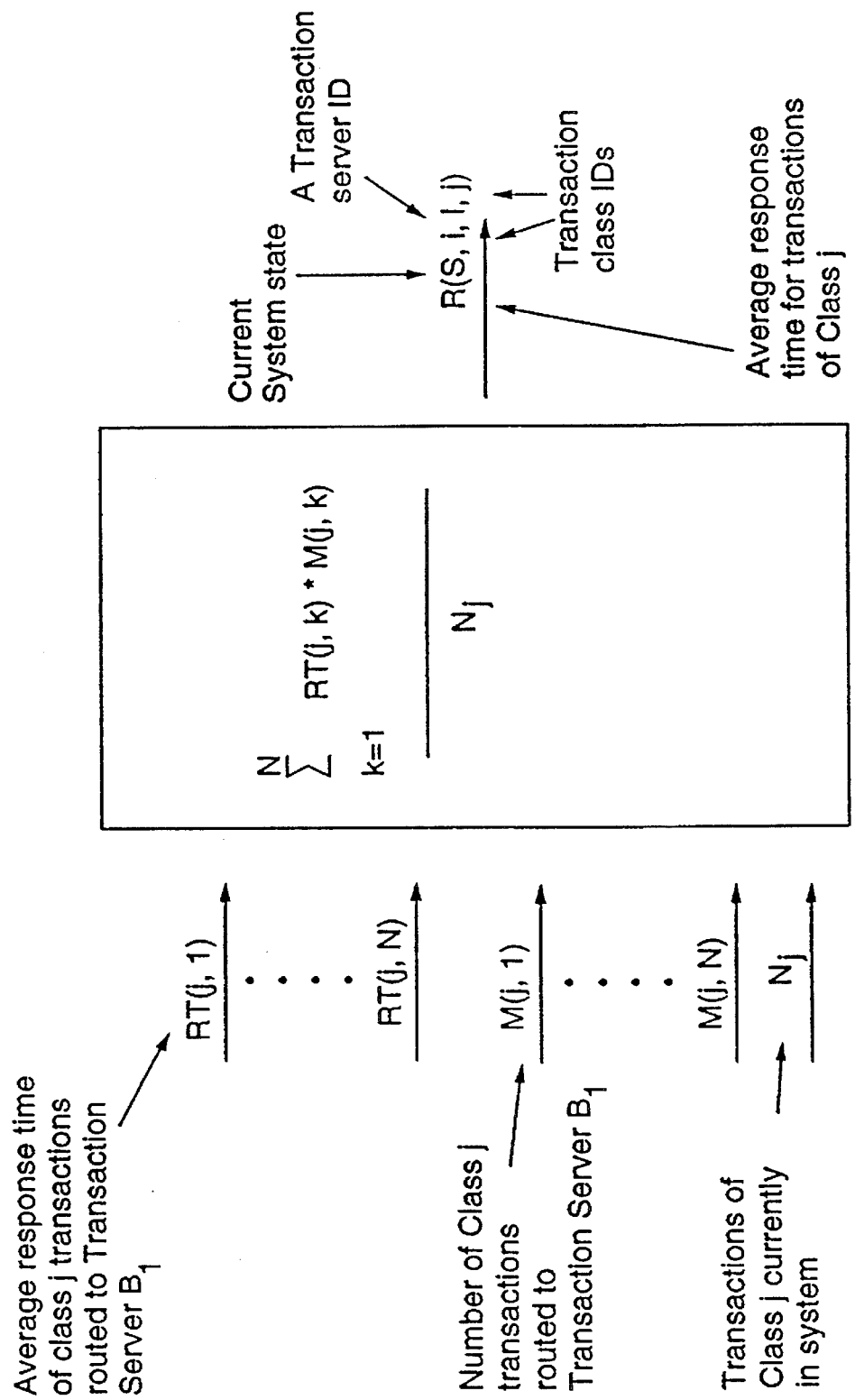
FIG. 3 illustrates the calculation of a current average class response time in accordance with the preferred embodiment.

These two matrices are semi-static and do not depend on the number of transactions of different classes in the system. The response time predictor is generally shown in FIG. 3 and will now be described. It is assumed that the class IDs are ordered so that $P_1 \geq P_2 \geq \ldots \geq P_K$. This simplifies the description but is not essential to the algorithm. The algorithm is as follows:

a. Initialize internal variables:
   1) $Q(m)=0$; $m=1,2,\ldots,N$
      {$Q(m)$ represents the amount of time a transaction will have to wait in queue until it receives the CPU, when it visits $B_m$. This quantity is difficult and cumbersome to compute exactly, and we resort here to an approximation. The algorithm starts from the highest priority class and initializes $Q(m)$ to zero. It then continually updates $Q(m)$ to take into account the fact that a transaction of class $C_i$ will have to wait until all transactions currently in the system from classes $C_j$, $j=1,\ldots,i$ are processed.}
   2) $RT(j,k)=0$; $j=1,2,\ldots,K$; $k=1,2,\ldots,N$
      {$RT(j,k)$ is the average response time of class $j$ transactions routed to processor $B_k$.}
   3) $RP(j,k,m)=0$; $j=1,2,\ldots,K$; $k=1,2,\ldots,N$; $m=1,2,\ldots,N$
      {$RP(j,k,m)$ is the estimate of the probability that a transaction of class $j$ routed to $B_k$ will be at BEP $m$.} b. Temporarily increment a local copy of $M(i,1)$ to reflect the proposed routing.
   {We now compute the expected queueing delays for the various transactions. Due to the priorities, a class $C_j$ transaction only queues behind transactions from class $1,2,\ldots,j-1$. The response time of a transaction is determined by its service demands and the queueing delays it experiences.} c. FOR $j=1$ TO $K$ DO
   1) FOR $k=1$ TO $N$ DO
      {Increase the expected time in the system by the queueing delay for the class/routing based on visits to the BEPs.} a) $S(j,k) = T(j,k) + \sum_{m=1}^{N} V(j,k,m) \cdot Q(m)$.

{Update the estimated probability of a class $C_j$ transaction waiting for CPU service at BEP $B_m$. We assume that this is proportional to the service demand and queueing delay at $B_m$ and inversely proportional to the total system time.}
   2) FOR $k=1$ TO $N$ DO
      a) FOR $m=1$ TO $N$ DO
         i. $RP(j,k,m) = \frac{W(j,k,m) + V(j,k,m) \cdot Q(m)}{S(j,k)}$ {Increase the expected queueing delay by the amount of additional queueing caused by this class. This is approximated by the mean service burst length times the probability of being queued for CPU service}
   3) FOR $m1$ TO $N$ DO a) $Q(m) = Q(m) + \left( \sum_{k=1}^{N} M(j,k) \cdot RP(j,k,m) \cdot B(j,k,m) \right)$.

4) Compute the response time of a $C_j$ transaction routed to $B_k$ based on service demand and queueing.
      FOR $k=1$ to $N$ DO a) $RT(j,k) = T(j,k) + \left( \sum_{m=1}^{N} Q(m) \cdot V(j,km) \right)$.

d. At this point, the response times of all transactions currently in the system have been predicted. The average value returned by the predictor is given as the weighted average:

FOR $j = 1$ TO $N$ DO $$R(S,i,l,j) = \frac{\sum_{k=1}^{N} RT(j,k) \cdot M(j,k)}{N_j}.$$

There are several potential optimization that can lower the computational cost of the response time predictor. First, for a given routing of $C_i$ to $B_l$, it is possible to compute $R(S, i, 1, j)$ for all $j$ in one pass through the algorithm. Second, a routing decision for class $C_i$ does not effect the results for any class $C_j$ with $P_j > P_i$. Many other optimizations to this basic scheme are possible. We describe next an algorithm with less computational overhead which differs from the one proposed above in two aspects. First, the algorithm does not attempt to calculate the probability of a class $C_j$ transaction waiting for CPU at BEB $B_k$. Instead, it computes the work on BEB $B_k$ due to class $C_j$, $Q(j,k)$, and assumes that the amount of time a transaction has to wait on BEP $B_k$ before it receives the CPU is $Q(1,k)+\ldots+Q(i,k)$. Second, it does not attempt to estimate the effect of routing on all classes. Instead, it routes the transaction to the BEP to which the estimated response time of the transaction is minimal.

A simplified Algorithm:

As before, it is assumed that a transaction of class $C_i$ has arrived at the FEP and an an estimate is wanted for the response time of the transaction if it routed to $B_l$. It is assumed again that the transaction indices are ordered so that transaction $j$ has higher priority than transaction $i$ if $j>i$.

Estimation algorithm a. Initialize internal variables.
   1) $Q(j,k)=0$: $j=1,\ldots,K$, $k=1,\ldots,N$
b. FOR $j=1$ TO $i$ DO
   1) FOR $k=1$ TO $N$ DO
      {estimate the work on $B_k$ due to class $C_j$.}

$Q(j,k) = \sum_{m=1}^{N} M(j,m) \cdot W(j,m,k)$ c. {Calculate the response time of the arrived transaction if it is routed to $B_l$. }

$$RT(i,l) = T(i,l) + \sum_{k=1}^{N} V(i,l,k) \left( \sum_{j=1}^{i} Q(j,k) \right)$$

Routing algorithm a. The transaction is routed to the $B_l$ for which $RT(i,k)$ is minimized.
b. $M(i,l) := M(i,l)+1$ {increase the number of $C_i$ transaction on $B_l$ by one.}

Implementation

This invention can be implemented in any multiple processor transaction processing system. The invention described here applies most directly to partitioned data (shared nothing) database systems. The invention can be applied to data sharing architectures by modifying the response time predictor. The transaction routing and dynamic priority techniques would not be changed for a data sharing architecture. The invention can be applied also to transaction processing systems with multiple FEP/DCs by having the DCs periodically share performance information.

While the invention has been particularly shown and described with reference to a preferred embodiment thereof, it will be understood by those skilled in the art that various changes in form and detail may be made therein without departing from the spirit and scope of the invention.

What is claimed is:

1. A workload manager for distributing incoming transactions among a plurality of transaction handling servers in a transaction based computer system, each transaction being a member of a particular one of a plurality of distinct transaction classes, said workload manager comprising:

means for determining an actual response time for each transaction completed by said computer system, said actual response time for any particular completed transaction being a length of time which has elapsed from an arrival time when said any particular completed transaction arrived at said computer system for handling and a completion time when said any particular completed transaction was completed by said computer system;

means for computing a current average class response time for each of said classes, said current average class response time for any particular class being an average which may be possibly weighted of said actual response times for completed transactions which are a member of said any particular class;

means for storing a class response time goal value for each of said classes, said class response time goal value for said any particular class being a desired value for said current average class response time for said any particular class;

means for computing a current class performance index for each of said classes from said current average class response times and said class response time goal values, said current class performance index for said any particular class being a value indicating how closely said current average class response time for said any particular class matches said class response time goal value for said any particular class;

means for computing for each class and for each server an average predicted response time for a transaction of said each class that has been routed to said each server and has not yet completed and for determining a number of uncompleted transactions of each said class routed to each said server;

means responsive to an arriving transaction for predicting from said current class performance index for each said class and from said average predicted response times and number of uncompleted transactions for each said class and each said server a set of predicted new class performance indices for each of a plurality of different possible alternative server choices to which said arriving transaction could be routed for handling, each said new set including a predicted new class performance index for each of said classes;

means for determining from each said set of predicted new class performance indices an overall goal satisfaction index corresponding to each of said plurality of different possible alternative server choices, said overall goal satisfaction index corresponding to any particular possible alternative server choice being a value indicating how closely said set of predicted new class performance indices for said any particular possible alternative server choice meets a predetermined response time goal criterion;

means for determining a best one of said overall goal satisfaction indices, said best one meeting said predetermined response time goal criterion more closely than any other one of said overall goal satisfaction indices; and a router for actually routing said arriving transaction to said server corresponding to said best one of said overall goal satisfaction indices.

2. A workload manager as defined in claim 1 wherein said current class performance index for a particular class is said current average class response time for said particular class divided by said class response time goal value for said particular class.

3. A workload manager as defined in claim 1 and further comprising:

means responsive to completion of transactions by said servers .for computing an actual response time for each completed transaction, said computed actual response times being used to update said current average class response times.

4. A workload manager as defined in claim 1 and further comprising:

means for placing said classes in a current priority order in accordance with said current class performance indices; and means for each of said servers to handle transactions routed to said each server in accordance with said current priority order.

5. A workload manager as defined in claim 4 wherein said current priority order results in a higher current priority for a class with a poorer current class performance index.

6. A workload manager as defined in claim 4 wherein said current priority order results in a higher current priority for a class with a higher current class performance index.

7. A workload manager as defined in claim 4 wherein said servers each include means for storing said current priority order of said classes.

8. A workload manager as defined in claim 4 wherein at least one of said servers maintains an active queue of transactions awaiting dispatch for service and a waiting queue of transactions awaiting transfer into said active queue, said at least one server dispatching transactions for service from said active queue in accordance with said current priority order of said classes.

* * * * *